UNITED STATES PATENT OFFICE.

HENRY BLAIR, OF GLEN ROSS, MARYLAND.

COTTON-PLANTER.

Specification of Letters Patent No. 15, dated August 31, 1836.

*To all whom it may concern:*

Be it known that I, HENRY BLAIR, of Glen Ross, in the county of Montgomery and State of Maryland, have invented a new and useful Machine, called the "Cotton-Planter," and that the following is a full and exact description thereof, viz:

Two side pieces five feet six inches long, six inches deep, and two and a half wide. A beam four feet long, rising in front six inches to the end of which is attached a clevis, and screw wrench mortised into the front ends of the side pieces, three inches from the ends are two cross pieces, the front of which is two feet six inches long, three inches broad, and one, and three fourths inches thick. The second six inches deep by two and a half width is tenoned into the side pieces, two feet six inches from the front of the front cross piece, into the center of which is tenoned the beam, one foot three inches back is a similar cross piece, and twelve inches back another, into the centers of which is tenoned a short beam through the center of which beam is let a movable bar ten inches long, with a bolt, and tap, attached to the lower end of which is a concave press cover ten inches long, twelve wide in front, and nine back. Three feet seven inches from the front ends of the side pieces is a dropping glender, two feet eight inches long, and six inches in diameter reduced to a square axle at each end, which is received into the hub of a wheel, three feet high, and dished three inches. The cylinder has holes on its periphery, which may be of any number, and of such size as to contain one or more seed, and grooved one inch from each end, and half inch deep to receive the head blocks, which are twelve inches long, eight deep, and two and a half wide, and the side pieces are cut in to receive the cylinder behind the head blocks, and to the side pieces and framed in the usual way, the handles with the upper ends two feet above the frame.

On the head blocks are two braces two inches deep by one and a half wide, transfixed to the head blocks, and side pieces by four bolts, and taps, between which, and touching upon one third the diameter, and two thirds of the length of the cylinder, between the head blocks is a hopper, which is made to hold, one, two or more gallons of seed, and made fast by two screw bolts passing through the sides of the hopper, and braces. Touching upon the upper unoccupied third of the cylinder is a draw door, which by means of a handle passing through the brace, is made to cover the holes on the cylinder within the hopper, so as to prevent the seed from dropping while turning or moving the machine, attached to the outside, or inside of the front ends of the side pieces one at nine, and the other at fifteen inches from the ends by two bolts, and taps each are two plow bars,—eighteen inches long to the lower ends of each of which are attached by means of two screw-bolts, two half shovels; twelve inches long and ten wide at the wing; right and left, or two six inch bar-share plows; with six inch land side, right, and left to which are attached by bolts, and taps in the usual way, a bar and share, and stayed by two rods, bolts, and taps, extending from the front cross piece to the bar—passing through the front beam, and attached by a bolt, and tap, two feet two inches back, from the front cross piece is a plow bar nine inches long to the lower end of which is attached by two screw bolts a tongue plow six and a half inches long, and three inches wide at the top.

Operation: When the horses draw the machine, the right, and left half shovels or bar shares (as the planter may choose) throws a ridge—the tongue plow makes the drill, the cylinder is revolving with the wheels, catches the seed in the holes made on its periphery as they pass through the hopper, and lets them drop into the drill, and the press cover closes the sides of the drill so as to cover the seed.

What I claim as new, and as my invention, and for which I shall claim Letters Patent, is—

The reversion of the disk of one or both wheels, so as to command the different distances of the rows, and the shifting of the plows from the inside to the outside of the side places, and vice versa, so as to throw a wide or narrow ridge.

In testimony that the above is a full and exact description of the construction, and operation of my machine as invented or improved by me, I have hereunto subscribed my hand.

HENRY $\underset{\text{mark}}{\overset{\text{his}}{\times}}$ BLAIR.

Witnesses:
ROBT. MILLS,
HENRY BISHOP.